(12) United States Patent
Nishii et al.

(10) Patent No.: US 10,989,115 B2
(45) Date of Patent: Apr. 27, 2021

(54) TURBOCHARGER

(71) Applicant: IHI Corporation, Koto-ku (JP)

(72) Inventors: Shunsuke Nishii, Tokyo (JP); Shinichi Kaneda, Tokyo (JP)

(73) Assignee: IHI Corporation, Koto-ku (JP)

(*) Notice: Subject to any disclaimer, the term of this patent is extended or adjusted under 35 U.S.C. 154(b) by 0 days.

(21) Appl. No.: 16/733,323

(22) Filed: Jan. 3, 2020

(65) Prior Publication Data
US 2020/0141316 A1 May 7, 2020

Related U.S. Application Data (63) Continuation of application No. PCT/JP2018/030202, filed on Aug. 13, 2018.

(30) Foreign Application Priority Data

Aug. 25, 2017 (JP) .............................. JP2017-162263

(51) Int. Cl.
| | | |
|---|---|---|
| *F02C 6/12* | (2006.01) | |
| *F01D 25/16* | (2006.01) | |
| *F01D 25/18* | (2006.01) | |
| *F02B 39/14* | (2006.01) | |

(52) U.S. Cl.
CPC ................ *F02C 6/12* (2013.01); *F01D 25/16* (2013.01); *F01D 25/18* (2013.01); *F02B 39/14* (2013.01); *F05D 2220/40* (2013.01)

(58) Field of Classification Search
CPC .......... F01D 25/16; F01D 25/18; F02B 39/00; F02B 39/14; F02C 6/12; F05D 2220/40;
(Continued)

(56) References Cited

U.S. PATENT DOCUMENTS 8,474,433 B2 * 7/2013 French .................... F02D 9/06
                                                                    123/320
9,212,700 B1 * 12/2015 Bucking ............... F16C 37/007
(Continued)

FOREIGN PATENT DOCUMENTS

| CN | 101473124 A | 7/2009 |
|---|---|---|
| CN | 105051348 A | 11/2015 |

(Continued)

OTHER PUBLICATIONS

International Search Report dated Oct. 2, 2018 in PCT/JP2018/030202 filed Aug. 13, 2018, 1 page.

(Continued)

*Primary Examiner* — Jesse S Bogue
(74) *Attorney, Agent, or Firm* — Oblon, McClelland, Maier & Neustadt, L.L.P.

(57) ABSTRACT

A turbocharger includes: a bearing; a bearing wall portion having a bearing hole in which the bearing is arranged; a separation wall portion, which is provided on a radially outer side of the bearing hole with respect to the bearing wall portion, and forms an internal space with the bearing wall portion; an oil discharge port, which is formed in the separation wall portion, and communicates with the internal space; and a guide portion, which is provided to the bearing wall portion facing the internal space, and separates away from the oil discharge port in a direction of a plane perpendicular to a center axis of the bearing as approaching the oil discharge port in a direction of the center axis.

6 Claims, 6 Drawing Sheets

(58) Field of Classification Search
CPC .. F05D 2240/53; F05D 2240/63; F16C 17/04; F16C 17/18
See application file for complete search history.

(56) References Cited

U.S. PATENT DOCUMENTS

| | | | |
|---|---|---|---|
| 9,638,198 B2* | 5/2017 | Norton | F16C 33/60 |
| 9,896,995 B2* | 2/2018 | Koyanagi | F01D 25/18 |
| 2010/0232959 A1 | 9/2010 | Takei et al. | |
| 2018/0003081 A1* | 1/2018 | Isayama | F04D 29/063 |

FOREIGN PATENT DOCUMENTS

| | | |
|---|---|---|
| CN | 107208542 A | 9/2017 |
| EP | 2 037 100 A1 | 3/2009 |
| EP | 2 154 348 A2 | 2/2010 |
| EP | 3 249 192 A1 | 11/2017 |
| JP | 9-41982 A | 2/1997 |
| JP | 11-36878 A | 2/1999 |
| JP | 2007-285252 A | 11/2007 |
| JP | 2011-111900 A | 6/2011 |
| JP | 2015-203360 A | 11/2015 |
| JP | 2017-72212 A | 4/2017 |
| WO | WO 2007/148390 A1 | 12/2007 |
| WO | WO 2017/042925 A1 | 3/2017 |

OTHER PUBLICATIONS

Office Action dated Feb. 7, 2021, issued in Chinese Patent Application No. 201880044915.9.

* cited by examiner

TURBOCHARGER

CROSS REFERENCE TO RELATED APPLICATIONS

This application is a continuation application of International Application No. PCT/JP2018/030202 filed on Aug. 13, 2018, which claims priority based on Japanese Patent Application No. 2017-162263 filed on Aug. 25, 2017, the entire contents of which are incorporated by reference herein.

BACKGROUND ART

Technical Field

The present disclosure relates to a turbocharger including a bearing.

Related Art

Hitherto, there has been known a turbocharger in which a shaft is axially supported by a bearing. A turbine impeller is provided at one end of the shaft. A compressor impeller is provided at another end of the shaft. The turbocharger is connected to an engine. The turbine impeller is rotated by exhaust gas discharged from the engine. The rotation of the turbine impeller causes the compressor impeller to rotate through the shaft. The turbocharger compresses air through the rotation of the compressor impeller and delivers the compressed air to the engine.

For example, in a turbocharger described in Patent Literature 1, a bearing hole (slide bearing portion) for receiving a bearing is formed in a housing. A guide groove is formed in the bearing hole. The guide groove is configured to guide lubricating oil downward, which has flowed into a gap between the bearing and the bearing hole. The lubricating oil is discharged from an oil discharge port.

CITATION LIST

Patent Literature

Patent Literature 1: Japanese Patent Application Laid-Open No. 2015-203360

SUMMARY

Technical Problem

According to the technology described in Patent Literature 1, the lubricating oil is introduced to the oil discharge port, and hence an oil-discharging performance is improved. For adaptation to higher rotation speed, there has been an attempt to improve bearing performance by increasing a supply amount of the lubricating oil. For adaptation to the increase in supply amount of the lubricating oil, there has been a demand for development of a technology for improving the oil-discharging performance.

The present disclosure has an object to provide a turbocharger which is capable of improving an oil-discharging performance.

Solution to Problem

In order to solve the above-mentioned problem, according to one mode of the present disclosure, there is provided a turbocharger including: a bearing; a bearing wall portion having a bearing hole in which the bearing is arranged; a separation wall portion, which is provided on a radially outer side of the bearing hole with respect to the bearing wall portion, and forms an internal space with the bearing wall portion; an oil discharge port, which is formed in the separation wall portion, and communicates with the internal space; and a guide portion, which is provided to the bearing wall portion facing the internal space, and separates away from the oil discharge port in a direction of a plane perpendicular to a center axis of the bearing as approaching the oil discharge port in a direction of the center axis.

The guide portion may have portions having a different inclination from each other depending on a position in the direction of the center axis.

The guide portion may include a first guide portion which extends toward the turbine impeller away from the oil discharge port and a second guide portion which extends toward the compressor impeller with respect to the first guide portion.

The turbocharger may further include a top portion which is formed between the first guide portion and the second guide portion, wherein a position of the top portion in the direction of the center axis corresponds with a position of the oil discharge port in the direction of the center axis.

Effects of Disclosure

According to the present disclosure, it is possible to secure a turbocharger which is capable of improving an oil-discharging performance.

DESCRIPTION OF EMBODIMENT

Now, with reference to the attached drawings, an embodiment of the present disclosure is described in detail. The dimensions, materials, and other specific numerical values represented in the embodiment are merely examples used for facilitating the understanding of the present disclosure, and do not limit the present disclosure otherwise particularly noted. Elements having substantially the same functions and configurations herein and in the drawings are denoted by the same reference symbols to omit redundant description thereof, and illustration of elements with no direct relationship to the present disclosure is omitted.

Figure 1:
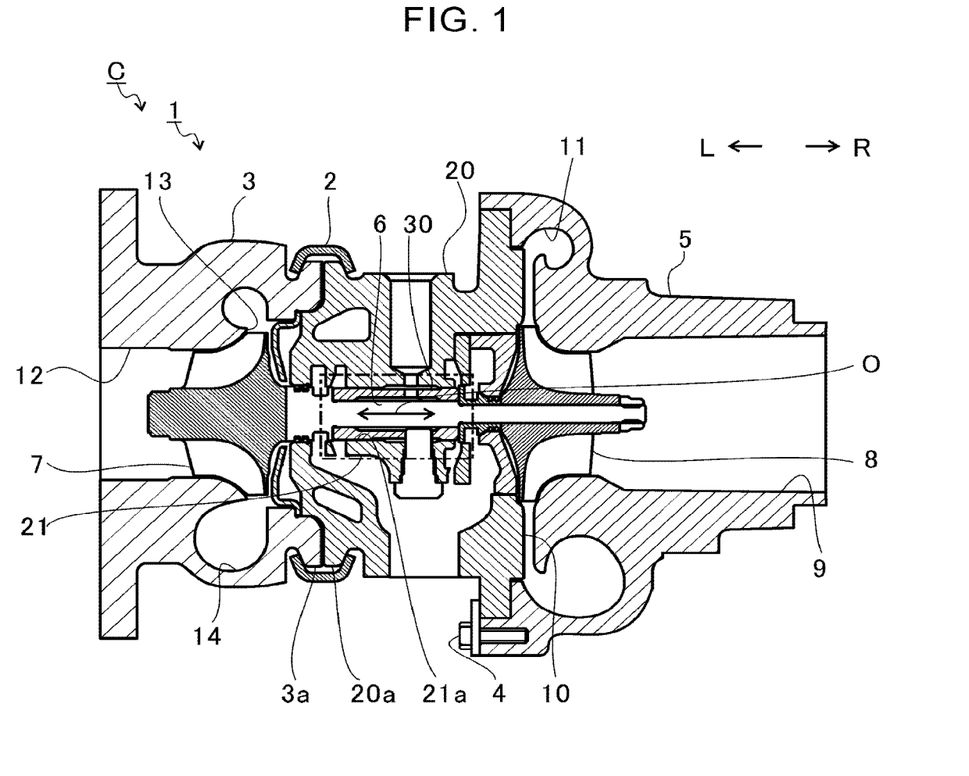
FIG. 1 is a schematic sectional view of a turbocharger.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 20. A turbine housing 3 is coupled to the left side of the bearing housing 20 by a fastening mechanism 2. A compressor housing 5 is coupled to the right side of the bearing housing 20 by a fastening bolt 4. The bearing housing 20, the turbine housing 3, and the compressor housing 5 are integrally formed.

On an outer peripheral surface of the bearing housing 20, there is provided a projection 20a. The projection 20a is formed in the vicinity of the turbine housing 3. The projection 20a projects in a radial direction of the bearing housing 20. Further, on an outer peripheral surface of the turbine housing 3, there is provided a projection 3a. The projection 3a is provided in a vicinity of the bearing housing 20. The projection 3a projects in a radial direction of the turbine housing 3. The bearing housing 20 and the turbine housing 3 are mounted to each other by band-fastening the projections 20a and 3a with the fastening mechanism 2. The fastening mechanism 2 is constructed by, for example, a G-coupling for clamping the projections 20a and 3a.

The bearing housing 20 includes a bearing wall portion 21. A bearing hole 21a is formed in the bearing wall portion 21. The bearing hole 21a penetrates in a right-and-left direction of the turbocharger C. A bearing 30 is provided in the bearing hole 21a. In FIG. 1, a semi-floating bearing is illustrated as one example of the bearing 30. However, the bearing 30 may be other radial bearing such as a full-floating bearing or a rolling bearing. A shaft 6 is supported by the bearing 30 so as to be rotatable. A turbine impeller 7 is provided to a left end portion of the shaft 6. The turbine impeller 7 is received in the turbine housing 3 so as to be rotatable. Further, a compressor impeller 8 is provided to a right end portion of the shaft 6. The compressor impeller 8 is received in the compressor housing 5 so as to be rotatable.

A suction port 9 is formed in the compressor housing 5. The suction port 9 is opened on the right side of the turbocharger C. The suction port 9 is connected to an air cleaner (not shown). Further, under a state in which the bearing housing 20 and the compressor housing 5 are coupled to each other by the fastening bolt 4, a diffuser flow passage 10 is formed. The diffuser flow passage 10 is formed of opposed surfaces of the bearing housing 20 and the compressor housing 5. In the diffuser flow passage 10, the air is increased in pressure. The diffuser flow passage 10 has an annular shape which extends from a radially inner side to a radially outer side of the shaft 6. The diffuser flow passage 10 communicates with the suction port 9 on the above-mentioned radially inner side through the compressor impeller 8.

Further, a compressor scroll flow passage 11 is provided to the compressor housing 5. The compressor scroll flow passage 11 has an annular shape. The compressor scroll flow passage 11 is positioned on the radially outer side of the shaft 6 with respect to the diffuser flow passage 10. The compressor scroll flow passage 11 communicates with a suction port of an engine (not shown). The compressor scroll flow passage 11 communicates also with the diffuser flow passage 10. Thus, when the compressor impeller 8 is rotated, air is sucked into the compressor housing 5 through the suction port 9. The sucked air is pressurized and increased in speed during a course of flowing through between blades of the compressor impeller 8. The air having been pressurized and increased in speed is increased in pressure in the diffuser flow passage 10 and the compressor scroll flow passage 11. The air increased in pressure is introduced to the suction port of the engine.

A discharge port 12 is formed in the turbine housing 3. The discharge port 12 is opened on the left side of the turbocharger C. The discharge port 12 is connected to an exhaust gas purification device (not shown). Further, a flow passage 13 and a turbine scroll flow passage 14 are formed in the turbine housing 3. The turbine scroll flow passage 14 has an annular shape. The turbine scroll flow passage 14 is positioned on the radially outer side of the turbine impeller 7 with respect to the flow passage 13. The turbine scroll flow passage 14 communicates with a gas inflow port (not shown). The exhaust gas discharged from an exhaust gas manifold of the engine (not shown) is introduced to the gas inflow port. The turbine scroll flow passage 14 communicates also with the turbine impeller 7 through the flow passage 13. Thus, the exhaust gas introduced through the gas inflow port to the turbine scroll flow passage 14 is introduced to the discharge port 12 through the flow passage 13 and the turbine impeller 7. The exhaust gas to be introduced to the discharge port 12 causes the turbine impeller 7 to rotate during a course of flowing.

Then, a rotational force of the turbine impeller 7 is transmitted to the compressor impeller 8 through the shaft 6. The rotational force of the compressor impeller 8 causes the air to be increased in pressure and introduced to the suction port of the engine as described above.

Figure 2:
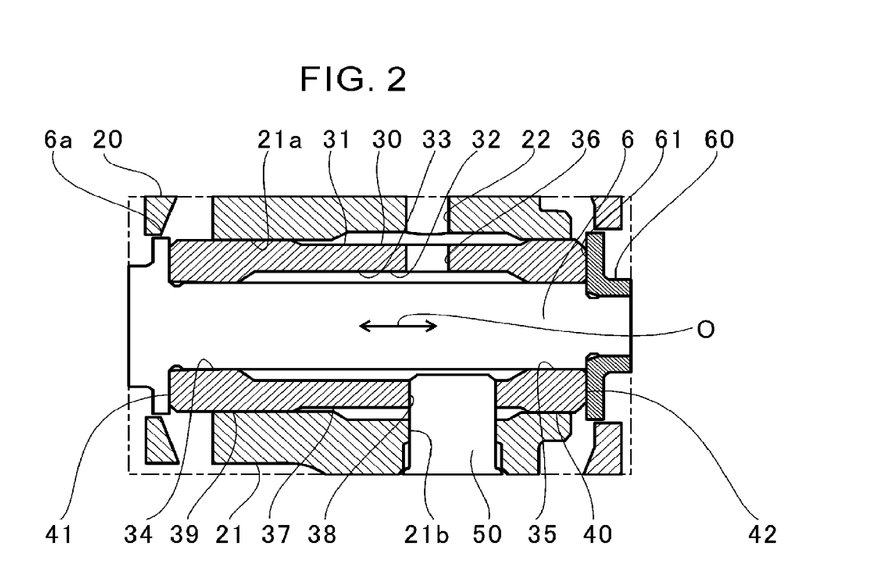
FIG. 2 is an extracted view of the one-dot chain line portion of FIG. 1.

FIG. 2 is an extracted view of the one-dot chain line portion of FIG. 1. As illustrated in FIG. 2, an oil passage 22 is formed in the bearing housing 20. The oil passage 22 penetrates from an outside of the bearing housing 20 to the bearing hole 21a. The lubricating oil flows into the bearing hole 21a from the oil passage 22. The bearing 30 is arranged in the bearing hole 21a. An insertion hole 32 is formed in a main body portion 31 of the bearing 30. The insertion hole 32 penetrates in an axial direction of the shaft 6 (hereinafter simply referred to as "axial direction"). The shaft 6 is inserted through the insertion hole 32. Two bearing surfaces 34 and 35 are formed on an inner peripheral surface 33 of the insertion hole 32. The bearing surfaces 34 and 35 are separated apart from each other in the axial direction.

Part of the lubricating oil having been supplied to the bearing hole 21a passes through an oil hole 36 and flows into the inner peripheral surface 33 of the main body portion 31. The oil hole 36 penetrates through the main body portion 31 from the inner peripheral surface 33 to an outer peripheral surface 37. The lubricating oil having flowed in spreads rightward and leftward in FIG. 2 from the oil hole 36. The lubricating oil having spread is supplied to a gap between the shaft 6 and each of the bearing surfaces 34 and 35. The shaft 6 is axially supported by an oil film pressure of the lubricating oil having been supplied to the gap between the shaft 6 and each of the bearing surfaces 34 and 35.

Further, a through hole 38 is provided to the main body portion 31. The through hole 38 penetrates from the inner peripheral surface 33 to the outer peripheral surface 37. The bearing wall portion 21 has a pin hole 21b. The pin hole 21b is formed at a portion opposed to the through hole 38. The pin hole 21b penetrates through a wall portion forming the bearing hole 21a. A positioning pin 50 is fitted to the pin hole 21b from a lower side in FIG. 2. A distal end of the positioning pin 50 is inserted in the through hole 38 of the bearing 30. The positioning pin 50 regulates rotation and axial movement of the bearing 30.

Further, an oil thrower member 60 is provided to the shaft 6. The oil thrower member 60 is arranged on the right side in FIG. 2 (compressor impeller 8 side) with respect to the main body portion 31. The oil thrower member 60 is an annular member. The oil thrower member 60 causes the lubricating oil, which has flowed to the compressor impeller 8 side along the shaft 6, to be diffused to the radially outer side. That is, the oil thrower member 60 suppresses leakage of the lubricating oil to the compressor impeller 8 side.

An opposed surface 61 of the oil thrower member 60 is opposed to the main body portion 31 in the axial direction. Further, the shaft 6 has a large-diameter portion 6a. The large-diameter portion 6a is positioned on the left side in FIG. 2 (turbine impeller 7 side) with respect to the main body portion 31. The large-diameter portion 6a is opposed to the main body portion 31 in the axial direction.

As described above, the axial movement of the main body portion 31 is regulated by the positioning pin 50. The main body portion 31 is arranged between the oil thrower member 60 and the large-diameter portion 6a in the axial direction. The lubricating oil is supplied to a gap between the main body portion 31 and the oil thrower member 60 and a gap between the main body portion 31 and the large-diameter portion 6a. When the shaft 6 moves in the axial direction, the oil thrower member 60 or the large-diameter portion 6a is supported by an oil film pressure generated between the main body portion 31 and the oil thrower member 60 or the large-diameter portion 6a. That is, in the bearing 30, both end surfaces of the main body portion 31 in the axial direction are thrust bearing surfaces 41 and 42. The thrust bearing surfaces 41 and 42 receive a thrust load.

Further, damper portions 39 and 40 are formed on both end sides of the outer peripheral surface of the main body portion 31 in the axial direction. The damper portions 39 and 40 suppress oscillation of the shaft 6 by the oil film pressure of the lubricating oil having been supplied to the gap formed with the inner peripheral surface of the bearing hole 21a.

Figure 3A:
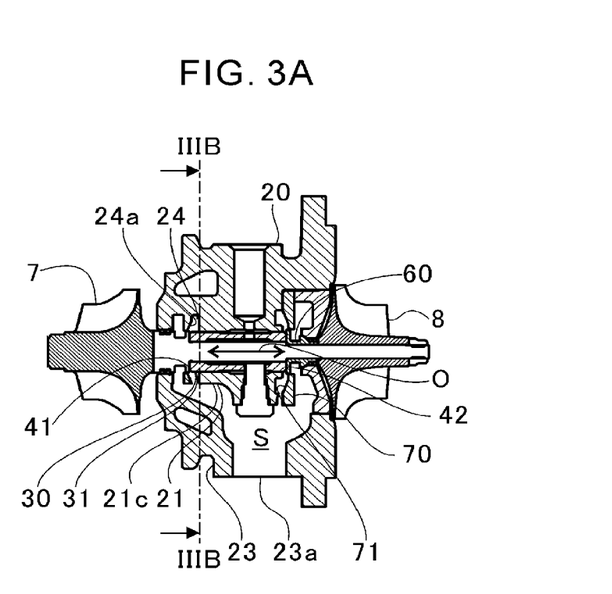
FIG. 3A is a sectional view which is the same as FIG. 1.
Figure 3B:
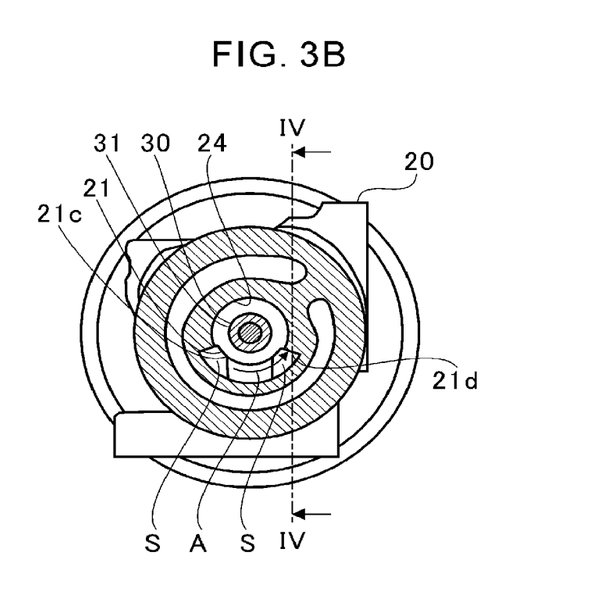
FIG. 3B is a sectional view taken along the line IIIB-IIIB of FIG. 3A.

FIG. 3A is a sectional view which is the same as FIG. 1. FIG. 3B is a sectional view taken along the line IIIB-IIIB of FIG. 3A. As illustrated in FIG. 3A, a separation wall portion 23 is formed in the bearing housing 20. The separation wall portion 23 is provided on a radially outer side (lower side in FIG. 3A) of the bearing hole with respect to the bearing wall portion 21. The separation wall portion 23 forms an internal space S with the bearing wall portion 21. An oil discharge port 23a is formed in the separation wall portion 23. The oil discharge port 23a communicates with the internal space S.

A groove portion 24 is formed in the bearing wall portion 21. The groove portion 24 is formed on a radially outer side of an end portion on the left side in FIG. 3A (turbine impeller 7 side) in the main body portion 31 of the bearing 30. The groove portion 24 is opened to the internal space S at a position including the oil discharge port 23a side (lower side in FIG. 3A) in the groove portion 24. A tapered surface 24a is formed in the groove portion 24. The tapered surface 24a is formed on an inner wall surface on the left side in FIG. 3A (turbine impeller 7 side) in the groove portion 24. The tapered surface 24a is inclined in the direction of approaching the left side in FIG. 3A (turbine impeller 7 side) as extending toward the radially inner side. The tapered surface 24a is formed on a radially outer side of the thrust bearing surface 41.

A guide plate 70 is provided on a radially outer side of the oil thrower member 60. The guide plate 70 is arranged on the right side in FIG. 3A (compressor impeller 8 side) with respect to the bearing wall portion 21. A gap in the axial direction is formed between the guide plate 70 and the bearing wall portion 21. The gap communicates with the internal space S. The guide plate 70 has a tapered surface 71. The tapered surface 71 is formed on an end surface on the left side in FIG. 3A (turbine impeller 7 side, bearing 30 side) on the guide plate 70. The tapered surface 71 is inclined in the direction of approaching the right side in FIG. 3A (compressor impeller 8 side) as extending toward the radially inner side. The tapered surface 71 is formed on a radially outer side of the thrust bearing surface 42.

As illustrated in FIG. 3B, the internal space S is formed on the radially outer side of the bearing wall portion 21 and on the oil discharge port 23a side (lower side in FIG. 3B) and extends in the rotation direction of the shaft 6. The internal space S has, for example, a fan shape on the radially outer side of the bearing wall portion 21. The internal space S is formed so as to include an arc-shaped wall surface 21c on the radially outer side of the shaft 6 and linear wall surfaces 21d on the front side and the rear side in the rotation direction of the shaft 6. The wall surface 21c is an outer surface of the bearing wall portion 21 on the internal space S side. Moreover, the internal space S does not extend on a side opposite to the oil discharge port 23a (upper side in FIG. 3B) with respect to the bearing wall portion 21. The lubricating oil having been diffused from the thrust bearing surface 41 toward the radially outer side is guided by the tapered surface 24a toward the right side in FIG. 3A (compressor impeller 8 side, oil discharge port 23a side in the center axis direction O). The lubricating oil passes through the fan-shaped internal space S illustrated in FIG. 3B and is introduced to the oil discharge port 23a.

Along with the rotation of the shaft 6, the lubricating oil is brought around in the same direction as the rotation of the shaft 6 (in FIG. 3B, the direction indicated by the arrow A). The lubricating oil hits against the wall surface 21d of the bearing wall portion 21 on a front side in the rotation direction of the shaft 6 with respect to the internal space S. When an oil amount is large, oil clogging may occur in the vicinity of the wall surface 21d.

Description has been made of the flow of the lubricating oil with reference to the cross section on the turbine impeller 7 side illustrated in FIG. 3B. However, a flow of the lubricating oil on the compressor impeller 8 side is similar to that on the turbine impeller 7 side. That is, the lubricating oil having been diffused toward the radially outer side from the thrust bearing surface 42 is guided by the tapered surface 71 toward the left side of FIG. 3A (turbine impeller 7 side, oil discharge port 23a side in the center axis direction O). The lubricating oil hits against the wall surface 21d of the bearing wall portion 21. When an oil amount is large, oil clogging may occur in the vicinity of the wall surface 21d.

Figure 4:
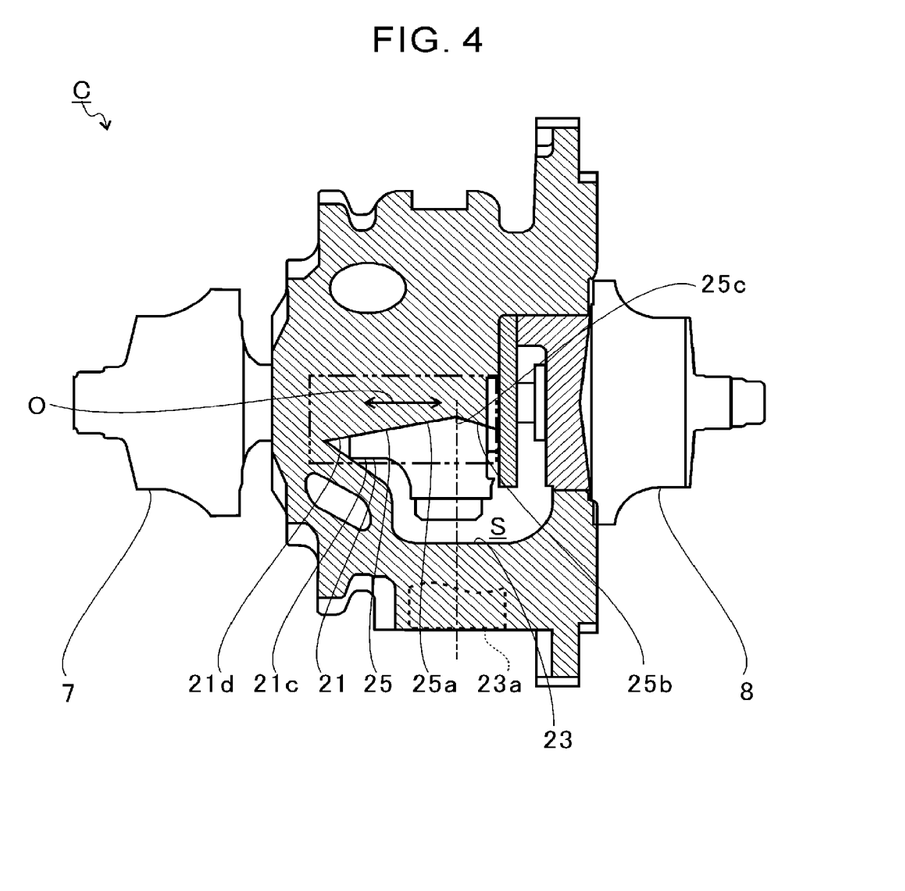
FIG. 4 is a sectional view taken along the line IV-IV of FIG. 3B.

FIG. 4 is a sectional view taken along the line IV-IV of FIG. 3B. In FIG. 4, the oil discharge port 23a and the internal space S in the vicinity of the oil discharge port 23a, which are different in position in the rotation direction of the shaft 6 and do not appear in the cross section, are indicated by broken lines. As illustrated in FIG. 4, the wall surface 21d of the bearing wall portion 21 serves as a guide portion 25. The guide portion 25 is, for example, an inclined surface. The guide portion 25 separates away from the oil discharge port 23a toward the upper side in FIG. 4 as a position thereof in the right-and-left direction in FIG. 4 approaches the oil discharge port 23a. That is, the guide portion 25 separates away from the oil discharge port 23a in a direction of a plane perpendicular to a center axis of the bearing 30 as a position thereof in the center axis direction O of the bearing 30 (that is, roughly the axial direction) approaches the oil discharge port 23a.

For example, in FIG. 4, the turbocharger C is arranged so as to be oriented with an upper side thereof being a vertically upper side and a lower side thereof being a vertically lower side. In this case, the guide portion 25 is inclined so as to be oriented toward the vertically upper side as a position thereof in the right-and-left direction in FIG. 4 approaches the oil discharge port 23a.

The guide portion 25 includes a first guide portion 25a and a second guide portion 25b. The first guide portion 25a extends from the oil discharge port 23a side toward the turbine impeller 7 side (left side in FIG. 4). In one example illustrated in FIG. 4, the first guide portion 25a is an inclined surface which is inclined so as to be oriented toward the vertically upper side as approaching the oil discharge port 23a side from the turbine impeller 7 side. However, a part of the first guide portion 25a may be an inclined surface which is inclined so as to be oriented toward the vertically upper side as approaching the oil discharge port 23a side from the turbine impeller 7 side. The second guide portion 25b extends toward the compressor impeller 8 side (right side in FIG. 4) with respect to the first guide portion 25a. In one example illustrated in FIG. 4, the second guide portion 25b is an inclined surface which is inclined so as to be oriented toward the vertically upper side as approaching the oil discharge port 23a side from the compressor impeller 8 side. However, a part of the second guide portion 25b may be an inclined surface which is inclined so as to be oriented toward the vertically upper side as approaching the oil discharge port 23a side from the compressor impeller 8 side.

In the guide portion 25, a top portion 25c is formed between the first guide portion 25a and the second guide portion 25b. A position of the top portion 25c in the center axis direction O of the bearing 30 (indicated by the one-dot chain line in FIG. 4) may correspond with a position of the oil discharge port 23a in the center axis direction O of the bearing 30. In this case, the top portion 25c is positioned within a range of the oil discharge port 23a in the center axis direction O of the bearing 30.

As described above, the lubricating oil having been guided by the tapered surfaces 24a and 71 toward the oil discharge port 23a side in the center axis direction O of the bearing 30 is brought around along with the rotation of the shaft 6. The lubricating oil is diffused in the rotation direction of the shaft 6 and hits against the guide portion (wall surface 21d). The lubricating oil having hit against the guide portion 25 is guided by the guide portion 25 toward the top portion 25c side. The lubricating oil having reached the top portion 25c from the first guide portion 25a side and the lubricating oil having reached the top portion 25c from the second guide portion 25b side hit against each other. The lubricating oils having hit against each other flows down toward the oil discharge port 23a. In such a manner, the oil clogging in the vicinity of the wall surface 21d is suppressed. The oil-discharging performance is improved.

Description has been made of the case in which the position of the top portion 25c in the center axis direction O of the bearing 30 corresponds with the position of the oil discharge port 23a in the center axis direction O of the bearing 30. In this case, the lubricating oil is likely to move toward the oil discharge port 23a. However, the position of the top portion 25c in the center axis direction O of the bearing 30 may not correspond with the position of the oil discharge port 23a in the center axis direction O of the bearing 30. The position of the top portion 25c in the center axis direction O of the bearing 30 may be located on the turbine impeller 7 side with respect to the oil discharge port 23a. The position of the top portion 25c in the center axis direction O of the bearing 30 may be located on the compressor impeller 8 side with respect to the oil discharge port 23a.

Moreover, description has been made of the case in which the guide portion 25 includes the first guide portion 25a and the second guide portion 25b. In this case, the oil-discharging performance on both of the turbine impeller 7 side and the compressor impeller 8 side is improved. However, the guide portion 25 may include only one of the first guide portion 25a and the second guide portion 25b. Even in this case, the lubricating oil is guided toward the oil discharge port 23a side by the first guide portion 25a or the second guide portion 25b. Therefore, the oil clogging in the vicinity of the wall surface 21d is suppressed. As a result, the oil-discharging performance is improved.

Figure 5:
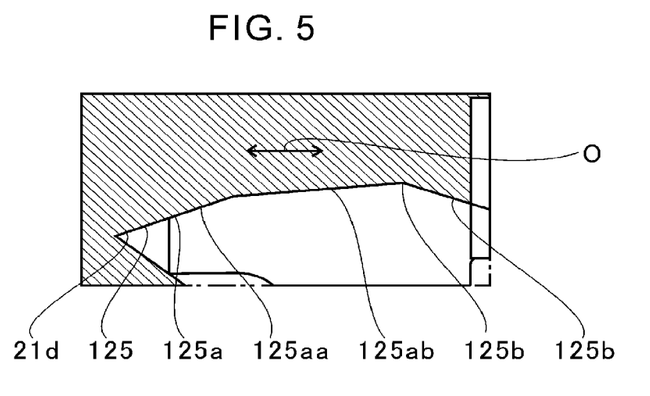
FIG. 5 is an explanatory view for illustrating a modification example.

FIG. 5 is an explanatory view for illustrating a modification example. In FIG. 5, there is given an extracted view at a position corresponding to the two-dot chain line portion of FIG. 4 in the modification example. As illustrated in FIG. 5, in the modification example, a guide portion 125 is formed so as to include a first guide portion 125a and a second guide portion 125b. The first guide portion 125a has portions having a different inclination from each other depending on a position thereof in the right-and-left direction in FIG. 5 (center axis direction O of the bearing 30).

Specifically, in the first guide portion 125a, a first inclined portion 125aa is formed on the left side in FIG. 5 (turbine impeller 7 side). In the first guide portion 125a, a second inclined portion 125ab is formed on the right side in FIG. 5 (compressor impeller 8 side). The first inclined portion 125aa has an inclination larger than that of the second inclined portion 125ab. The second inclined portion 125ab is oriented closer to the center axis direction O of the bearing 30 than the first inclined portion 125aa.

For example, consideration is made of the case in which the lubricating oil hits on the left side in FIG. 5 (turbine impeller 7 side) of the first guide portion 125a. When the first inclined portion 125aa is provided in a region which corresponds with the position at which the lubricating oil hits in the first guide portion 125a, the lubricating oil having hit against the first guide portion 125a is more likely to be guided toward the top portion 125c side. Moreover, when the second inclined portion 125ab is provided on the oil discharge port 23a side with respect to the first inclined portion 125aa in the first guide portion 125a, expansion of the internal space S on the oil discharge port 23a side can be suppressed. For example, consideration is made of a case in which, depending on the specifications on the engine side or the like, a coolant liquid (cooling medium) flows in a vicinity of the internal space S. Interference between the internal space S and a passage space for allowing the cooling medium to flow therethrough is more likely to be avoided, and hence a degree of freedom in design is improved. As described above, when the guide portion 125 has a portion having a different inclination depending on a position thereof in the right-and-left direction in FIG. 5 (center axis direction O of the bearing 30), the oil-discharging performance is improved without unnecessary expansion of the internal space S.

Description has been made of the case in which, in the first guide portion 125a, the portion (first inclined portion 125aa) on the left side in FIG. 5 (turbine impeller 7 side) has an inclination larger than that of the portion (second inclined portion 125ab) on the right side in FIG. 5 (compressor impeller 8 side). However, in the first guide portion 125a, the portion (first inclined portion 125aa) on the left side in FIG. 5 (turbine impeller 7 side) may have an inclination smaller than that of the portion (second inclined portion 125ab) on the right side in FIG. 5 (compressor impeller 8 side). A positional relationship between the first inclined portion 125aa and the second inclined portion 125ab may suitably be changed in accordance with a flow of the lubricating oil. Moreover, any one of the first inclined portion 125aa and the second inclined portion 125ab may have a smaller inclination. One of the first inclined portion 125aa and the second inclined portion 125ab having a smaller inclination may be parallel to the center axis. Moreover, one of the first inclined portion 125aa and the second inclined portion 125ab having a smaller inclination may be inclined in a direction of approaching the oil discharge port 23a (for example, toward the vertically lower side) as extending toward the right side in FIG. 5 (compressor impeller 8 side).

Description has been made of the case in which the first guide portion 125a has portions having a different inclination from each other depending on a position thereof in the right-and-left direction in FIG. 5 (center axis direction O of the bearing 30). However, the second guide portion 125b may have portions having a different inclination from each other depending on a position thereof in the right-and-left direction in FIG. 5 (center axis direction O of the bearing 30). Both of the first guide portion 125a and the second guide portion 125b may have portions having a different inclination from each other depending on a position thereof in the right-and-left direction in FIG. 5 (center axis direction O of the bearing 30).

The embodiment has been described above with reference to the attached drawings, but, needless to say, the present disclosure is not limited to the above-mentioned embodiment. It is apparent that those skilled in the art may arrive at various alterations and modifications within the scope of claims, and those examples are construed as naturally falling within the technical scope of the present disclosure.

INDUSTRIAL APPLICABILITY

The present disclosure is applicable to a turbocharger including a bearing.

What is claimed is:

1. A turbocharger comprising:
   a bearing;
   a bearing wall portion having a bearing hole in which the bearing is arranged, the bearing wall portion including a guide portion;
   a separation wall portion, which is provided on a radially outer side of the bearing hole with respect to the bearing wall portion, and forms an internal space with the bearing wall portion; and
   an oil discharge port, which is formed in the separation wall portion, and communicates with the internal space,
   wherein the guide portion faces the internal space, and increasingly separates away from the oil discharge port following a direction of a plane perpendicular to a center axis of the bearing, while approaching the oil discharge port in a direction following the center axis from an end portion of the guide portion, opposite to the oil discharge port side which is arranged at a position in the center axis direction of an end surface of the bearing.

2. The turbocharger according to claim 1, wherein the guide portion has portions having a different inclination from each other depending on a position in the direction of the center axis.

3. The turbocharger according to claim 1, wherein the guide portion includes:
   a first guide portion which extends toward the turbine impeller away from the oil discharge port; and
   a second guide portion which extends toward the compressor impeller with respect to the first guide portion.

4. The turbocharger according to claim 2, wherein the guide portion includes:
   a first guide portion which extends toward the turbine impeller away from the oil discharge port; and
   a second guide portion which extends toward the compressor impeller with respect to the first guide portion.

5. The turbocharger according to claim 3, further comprising a top portion which is formed between the first guide portion and the second guide portion,
   wherein a position of the top portion in the direction of the center axis overlaps a position of the oil discharge port in the direction of the center axis.

6. The turbocharger according to claim 4, further comprising a top portion which is formed between the first guide portion and the second guide portion,
   wherein a position of the top portion in the direction of the center axis overlaps a position of the oil discharge port in the direction of the center axis.

* * * * *